March 3, 1970   NORIO TAKADA   3,498,425
CHAIN TRANSMISSION WITH CALIPER BRAKE
Filed Nov. 27, 1968   3 Sheets-Sheet 1

Norio Tanaka
INVENTOR.
BY George D. Quyinth
Attorney

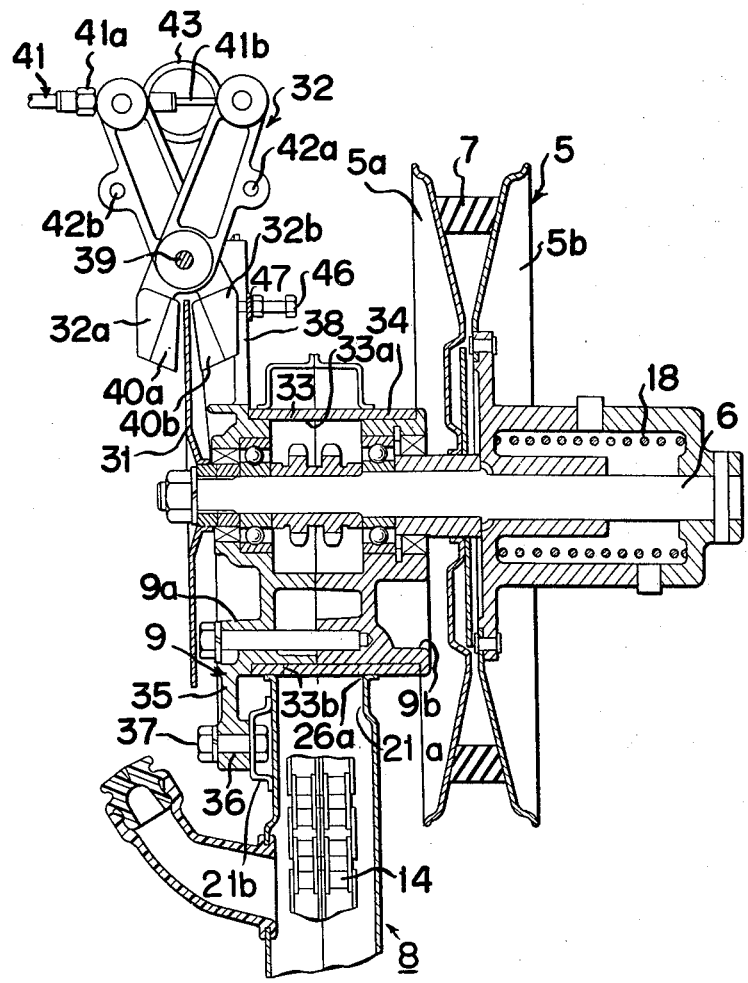

United States Patent Office 3,498,425
Patented Mar. 3, 1970

3,498,425
CHAIN TRANSMISSION WITH CALIPER BRAKE
Norio Takada, Hamamatsu-shi, Japan, assignor to Yamaha Hatsudoki Kabushiki Kaisha, Shizuoka-ken, Japan, a corporation of Japan
Filed Nov. 27, 1968, Ser. No. 779,469
Int. Cl. F16d *13/76;* F16h *55/30;* B62d *55/30*
U.S. Cl. 192—4                                  8 Claims

ABSTRACT OF THE DISCLOSURE

The device includes a countershaft, a front shaft, and an endless chain extending over the shafts through sprockets. The countershaft is rotatably mounted in a bracket which is movable to change the center distance between the shafts in order to adjust the tension of the endless chain. A brake disk mounted on the countershaft is in friction engagement with a pair of cooperating shoe-carrying brake calipers, when the brake calipers are in operative positions. Since the calipers are connected to the bracket, the relative positions between the brake disk and brake calipers are not changed even if the bracket is adjustably moved.

CROSS-REFERENCES TO RELATED APPLICATIONS

The subject matter of the transmission device of this invention is disclosed in applicant's copending application Ser. No. 773,762, filed on Nov. 6, 1968 and assigned to the same assignee.

BACKGROUND OF THE INVENTION

This invention relates to a combination of a transmission device and a brake device for an endless-track vehicle capable of automatically changing the speed, and which is used mainly for travelling on snow.

A small vehicle of this type treads on, or pushes, snow when it travels, so that its running resistance is large. The speed of the vehicle will be spontaneously retarded without braking if the opening of the throttle valve of the engine is kept small. A conventional vehicle of this type thus commonly employs a brake of simple construction. Such a conventional vehicle comprises, for example, a body, a support mounted on the body, a countershaft rotatably mounted on the upper end of the support, a front shaft to drive an endless track and an endless chain extending over the countershaft and the front shaft through sprockets, said countershaft receiving power through speed changing means. The countershaft is connected with a driven sheave disk, with which an arm having a brake shoe and mounted on the support is forcedly engaged to reduce or stop the rotation of the countershaft. Since the brake shoe fracitionally engages one side surface of the driven sheave disk, the driven sheave disk tends to be deformed. Such deformation of the disk will produce the danger that sufficient braking action is effected. To remove these defects, a transmission device which has a brake disk mounted at one end of the countershaft and an arm having a brake shoe connected to the support was proposed. But, the relative positions between the brake disk and the brake shoe are varied when the position of the countershaft is moved. A change in the position of the countershaft is necessary when the center distance between the countershaft and the front shaft should be adjusted to vary the tension of the endless chain without the aid of a tension roller.

SUMMARY OF THE INVENTION

An object of this invention is to provide a combined arrangement of a transmission device and a brake device, which comprises a countershaft connected to a source of power at one end and having a brake disk at the other, a front shaft to transmit power to an endless track, sprockets mounted respectively on said countershaft and front shaft, an endless chain extending over said sprockets, a bracket supporting the countershaft, brake calipers connected to said bracket, and in which the axis of the countershaft is variable to adjust the tension of the endless chain by moving the position of the bracket without producing an adverse effect on the braking action.

Another object of this invention is to provide a brake device comprising brake calipers which are cooperatively moved to pinch the brake disk so that brake shoes connected to the brake calipers are pressed to frictionally engage the both surfaces of the brake disk.

BRIEF EXPLANATION OF THE DRAWINGS

FIG. 5 is a cross-section taken along line IV—IV of FIG. 4, showing a modification of the transmission-brake device according to this invention.

DETAILED DESCRIPTION OF THE INVENTION

Figure 1:
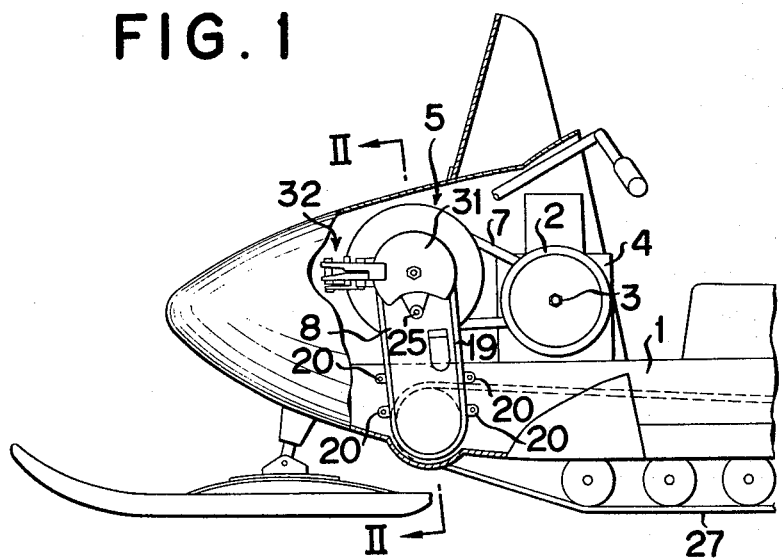
FIG. 1 shows an endless-track vehicle equipped with a transmission device combined with a brake device embodying this invention.
Figure 3:
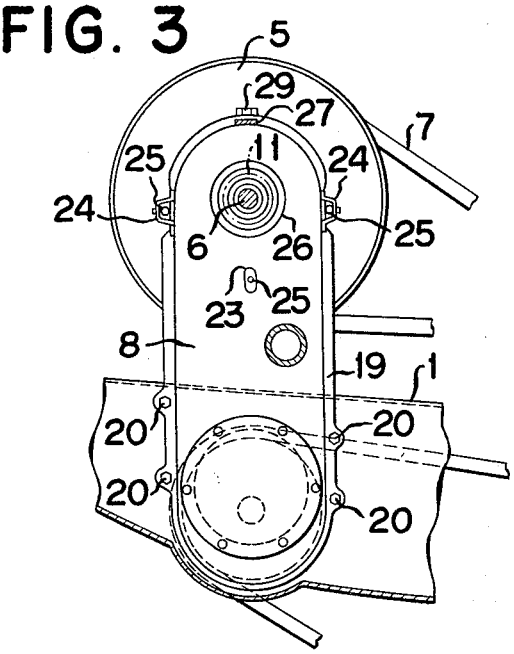
FIG. 3 is a side view of the device taken along line III—III of FIG. 2, with a part broken away.
Figure 2:
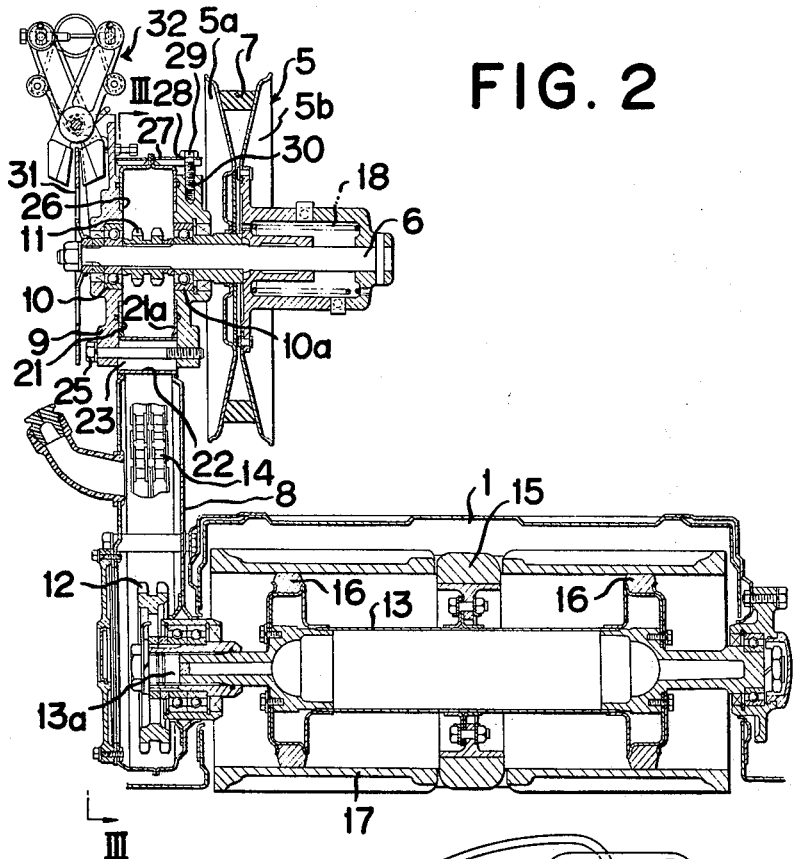
FIG. 2 is a vertical cross-section of the transmission-brake device taken along line II—II of FIG. 1.

The same or similar parts are designated by the same reference numerals throughout the several views. Referring to FIGS. 1 to 3, a transmission device combined with a brake device, which is mounted on the forward portion of an endless-track vehicle, includes a sheave drive and a chain drive. The sheave drive comprises a driving sheave 2 mounted on the power take-off shaft 3 of an engine 4, a driven sheave 5 mounted on a countershaft 6, and an endless V-shaped belt extending over said sheaves 2 and 5 for power transmission. The chain drive includes a vertical support or a box-shaped chain housing 8 rigidly secured to one side of the vehicle frame 1, a bracket 9 comprising a pair of bracket sections 9a and 9b disposed in the upper portion of the housing 8, a pair of bearings 10 and 10a nested in said bracket sections 9a and 9b and which carry the countershaft 6, a driving sprocket 11 splined on the countershaft 6, a driven sprocket 12 splined on a front shaft 13 at one end 13a thereof which extends into the housing 8, and an endless chain 14 extending over said sprocket 11 and 12. A toothed wheel 15 is mounted on an intermediate portion of the front shaft 13, and two guide wheels 16 are secured on the front shaft 13 at both end portions thereof. An endless track 17 is interlocked with the toothed wheel 15 and extends over the toothed wheel 15 and a driven wheel (not shown), and also over the guide wheels 16 and rear-positioned guide wheels (not shown). The driven sprocket 12 transmits power to cause the endless track 17 to be driven.

The driven sheave 5 constituting an important part of a so-called variable speed sheave drive comprises a pair of conical stationary and movable members 5a and 5b, the stationary member 5a being fixedly secured to the countershaft 6, and the movable member 5b being secured to the countershaft 6 movably in the axial direction thereof. The opposing conical surfaces of said members 5a and 5b are urged to each other by means of a spring 18. The movable member 5b is moved away from the stationary member 5a against the force of the spring 18 when the engine speed is increased or when the resistance applied to the running vehicle is reduced, so that the reduction ratio of the device may be continuously decreased without gear changing operation.

The housing 8 has a hollow columnar or pillar-shaped configuration which entirely covers the sprockets and the endless chain. On the periphery of the housing 8 is formed a flange or web 19 having in its lower portion openings through which locking bolts 20 are inserted to secure the housing on the vehicle frame 1. A hollow cylinder 22 having open ends is bridged between opposing side walls 21 and 21a of the housing 8 so that the interior of the cylinder 22 defines an idle bore 23. The housing 8 has two substantially channel-shaped members 24.

The bracket sections 9a and 9b are fixed to the housing 8 by bolts 25 loosely through said idle holes 23 and channels 24 in a manner to sandwich the chain housing.

The side walls 21 and 21a of the housing 8 have coaxially opposing openings 26 formed in the upper portions thereof. The diameter of each opening 26 is larger than the maximum diameter of the driving sprocket 11.

To the top of the housing 8 is welded a stay 27 having through openings 28, through which adjusting bolts 29 are vertically screwed into threaded bores 30 formed in the top surfaces of the bracket sections 9a and 9b.

Where it is desired or necessary to change the tension of the endless chain extending over the driving and driven sprockets 11 and 12 in order to change the efficiency of transmission of power, the center distance between the axes of these sprockets may be changed. This may be achieved in the following manner. The bracket sections 9a and 9b are first released from their rigid engagement with the side walls 21 and 21a of the housing by slightly unscrewing the locking bolts 25, secondly moved in a vertical or longitudinal direction of the housing by rotating the adjusting bolts 29, and finally rigidly secured again by screwing the locking bolts 25 to the housing at a new position defined by the adjustment of the adjusting bolts 29.

As shown in FIGS. 1 and 2, a brake disk 31 is splined on the outer end of the countershaft 6. The brake disk 31 is associated with novel braking means generally designated by 32, which will be described later in detail.

Consequently, when compared with a prior art arrangement, the transmission device embodying this invention has a strong and rigid construction and can be simply fabricated so as to eliminate waste materials. This is important from the standpoint of best design. Since the countershaft 6 on which the sprocket 11 is mounted is supported only by the bearings 10 and 10a nested in the bracket 9 and is free from connection with any other supporting members, the distance between the axes of the sprockets 11 and 12 can be easily varied merely by adjustably moving the position of the bracket 9 relative to the longitudinal axis of the housing 8 with the aid of the locking bolts 25 and the adjusting bolts 29.

Figure 4:
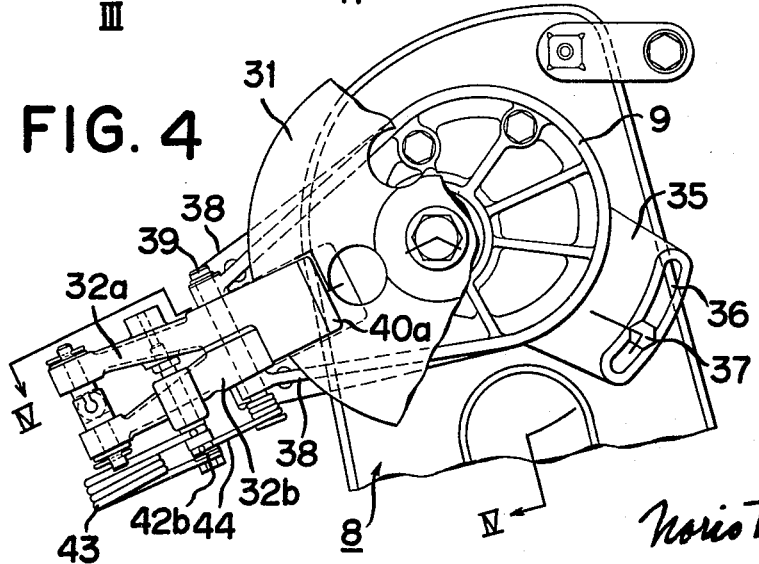
FIG. 4 is a side view of a part of the device showing a modification of the first embodiment of FIGS. 1 to 3.

FIGS. 4 and 5 show a modification of the transmission device. As shown, the housing 8 has opposing circular openings 26a formed in the side walls 21 and 21a thereof. A hollow cylindrical member 33 having in its bottom wall an opening 33b through which the endless chain 14 runs is rigidly fitted into the circular openings 26a so as to bridge the side walls 21 and 21a.

The common outer surface of the bracket sections 9a and 9b is partly reduced so that such reduced surface 34 fittedly engages the inner surface 33a of the hollow cylindrical member 33.

The bracket 9 is movable or rotatable around the axis of the cylindrical member 33, which is eccentric to the axis of rotation of the countershaft 6. One of the bracket sections 9a has a guide member 35 which is provided with a slit 36 therein. The slit 36 is so arcuated that its center line has an axis common to the cylindrical member 33, so that the bracket is normally rigidly secured to the housing by locking bolts 25a and 37. When it is desired to change the tension of the chain 14, both locking bolts may be slightly unscrewed and the bolt 37 may be slidably moved in the slit 36 thereby to rotate the bracket around the axis of the cylindrical member 33 and hence to vary the center distance between the driving and driven sprockets. Thereafter the bolts 25a and 37 may be again tightened.

The braking means associated with the transmission device will now be described with particular reference to FIGS. 4 and 5. The brake device as shown comprises a brake caliper device 32 including a pair of calipers 32a and 32b and the brake disk 31 as already mentioned. A pair of projections 38 are formed integrally with the bracket 9 at positions remote from that of the guide member 35 with respect to the axis of the countershaft 6. A hinge pin 39 is bridged between the forward ends of the projections 38 and rotatably carries said pair of calipers 32a and 32b. The calipers 32a and 32b are provided at their forward ends with a pair of brake shoes 40a and 40b which are so spacedly opposed that the periphery of the brake disk 31 is positioned therebetween. The outer ends of the calipers are connected to a Bowden cable 41 comprising a tube 41a and a wire 41b slidably movable in said tube 41a. More particularly, one end of the tube is connected to one of the calipers 32b, and one end of the wire 41b which partly extending from the end of the tube is connected to the other caliper 41b. The calipers have outwardly extending projections at respective intermediate portions thereof, said projections having bores to rigidly receive pins 42a and 42b. A coil spring 43 is connected to said pins 42a and 42b so that the calipers are normally urged in a non-operative position. As a bias coil spring 44 is wound round the hinge pin 39, and its both ends are connected both to the pin 42b and one of the projections 38. The forward end of the caliper 32b is pressed against the tip end of an adjusting bolt 46 which is screwed in a bridge 47 connected between said pair of projections 38. Thus, the position of the caliper 32b relative to the brake disk 31 is adjustable by the adjusting bolt 46.

In operation, when a brake lever (not shown) is operated, the wire 41b is caused to be slidably pulled within the tube 41a, so that the rear ends of the calipers 32a and 32b approach each other against the repulsive force of the coil spring 43. This causes the brake shoes 40a and 40b to move inwardly to sandwichingly hold the rotating brake disk 31. One of the calipers, namely, the caliper 32b, however, is urged by the bias coil spring 44 in such a manner that the brake shoe 40b is inclined to move to a position at which it is separated from the brake disk 31 to the maximum extent. Thus, the caliper 32b becomes operative when the caliper 32a first engages the brake disk 31 and the force acting on the caliper 32a to direct it toward the brake disk 31 becomes equal to the force of the bias coil spring 44. Finally, the calipers 32a and 32b are operated similarly and are sandwichingly pressed against the braking disk to generate a friction force at the contact surfaces, whereby the rotation of the countershaft 6 is reduced or stopped to bring the vehicle to a state of rest.

It will be understood that the force applied to the caliper 32a to pressedly engage the disk 31 is always greater than that given to the insidely positioned caliper 32b by an amount equal to that of the force generated by the bias coil spring 44. Thus, the brake disk 31 can be sandwiched by a pair of brake shoes and frictionally pressed thereby under forces equally applied from both directions.

In the foregoing embodiments, the bracket sections are supported by a box-shaped housing, but may be supported by arms separately mounted on the vehicle frame. It should be appreciated that the bracket sections may be integrally formed. Further, in the foregoing embodiments, the driving sprocket and the brake disk have been described as being splined directly on the countershaft. When it is desired that the driving sprocket is mounted on the countershaft rotatably in such a manner that a dog clutch is engageably disposed between the driving sprocket and the countershaft, it is apparent that the brake disk may be mounted rotatably on the countershaft and the interlocked to the driving sprocket.

What is claimed is:
1. A combination of a transmission device and a brake device for an endless-track vehicle comprising;
   (a) a support secured to a body of said endless-track vehicle at the lower portion thereof and upwardly raised thereon,
   (b) a bracket disposed on the upper portion of said support,
   (c) setting means for releasably setting said bracket relative to said support,
   (d) a countershaft rotatably carried by said bracket,
   (e) a front shaft for transmitting power to drive an endless-track;
   (f) a driving sprocket secured to said countershaft,
   (g) a driven sprocket secured to said front shaft,
   (h) an endless chain stretched over said sprockets,
   (i) the output power of an engine of said endless-track vehicle being transmitted to said countershaft by a speed-changing drive means,
   (j) a brake disk secured to said countershaft and interlocked with said driving sprocket, and
   (k) a brake caliper device secured to said bracket, and which has a pair of brake shoes so as to pinch said brake disk.

2. A combination of a transmission device and a brake device for an endless-track vehicle as claimed in claim 1 in which said setting means consists of locking bolts adapted to secure the bracket to the support and adjusting bolts adapted to move the bracket to the upper portion in a direction which enables the distance between the axes of said sprockets to be varied.

3. A combination of a transmission device and a brake device for an endless-track vehicle as claimed in claim 1 in which said bracket is rotatable around the axis defined on the upper portion of said housing eccentrically to the countershaft.

4. A combination of a transmission device and a brake device for an endless-track vehicle as claimed in claim 1 in which said support is a box-shaped chain housing, covering said endless chain stretched across said sprockets.

5. A combination of a transmission device and a brake device for an endless-track vehicle as claimed in claim 2 in which said support is a box-shaped chain housing, covering said endless chain stretched across said sprockets.

6. A combination of a transmission device and a brake device for an endless-track vehicle as claimed in claim 4 in which said bracket comprises a pair of bracket sections attaching to both sides of said box-shaped chain housing.

7. A combination of a transmission device and a brake device for an endless-track vehicle as claimed in claim 3 in which said support is a box-shaped chain housing, covering said endless chain stretched across said sprockets.

8. A combination of a transmission device and a brake device as claimed in claim 1 wherein said brake caliper device having said brake shoes comprises a pair of caliper members having said brake shoes as opposed to brake shoes at the end portion, said caliper members each being rotatably mounted to said bracket, a return spring to open said caliper members, a Bowden cable for releasably closing said caliper members, and a bias spring adapted to bias one of said caliper members against said bracket.

References Cited

UNITED STATES PATENTS 3,017,785   1/1962   Brugghen et al. _____ 192—4 X

BENJAMIN W. WYCHE III, Primary Examiner

U.S. Cl. X.R.

180—9.64; 188—73; 192—11